Figures 1, 2, 3:
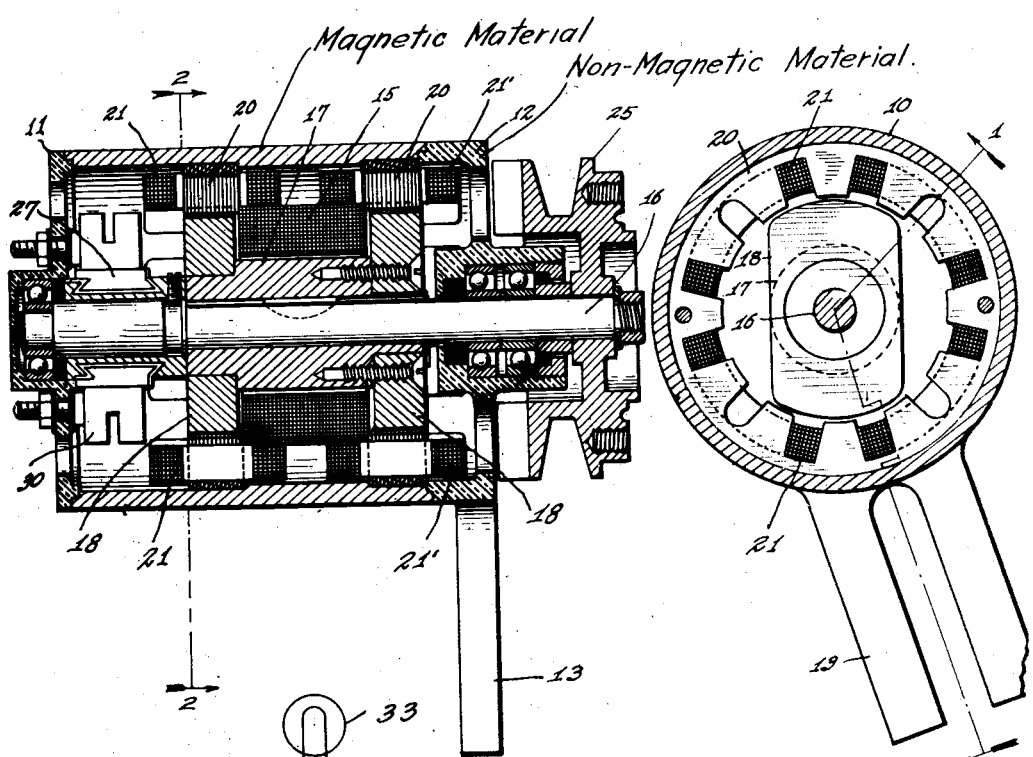

May 31, 1938.  J. M. WEYDELL  2,119,477

GENERATOR

Filed Feb. 5, 1936

Inventor
JARL M. WEYDELL,
By
Attorneys

Patented May 31, 1938

2,119,477

UNITED STATES PATENT OFFICE 2,119,477

GENERATOR

Jarl M. Weydell, Indianapolis, Ind., assignor of one-half to Edward E. Stout, Indianapolis, Ind.

Application February 5, 1936, Serial No. 62,422

6 Claims. (Cl. 171—209)

My invention relates to electrical generators, and particularly to generators suitable for use in automobiles and railway cars where the generator operates at varying speeds to supply current for a load including a storage battery. It has been the almost universal practice to employ direct-current generators for such uses, in spite of the fact that, except for the storage battery, the translating devices included in the load would in general operate as satisfactorily on alternating current as on direct. In fact, where the automobile is provided with a radio receiving set it is customary to convert into alternating current the direct current supplied by the generator, such alternating current being used in the radio set.

It is the object of my invention to produce a generator which will supply both alternating and direct current and which, at the same time, will operate satisfactorily under the varying speeds. A further object of my invention is to produce a generator in which all the windings will be stationary in order to eliminate or greatly simplify the necessary arrangement of collector rings, brushes, and commutator.

In carrying out my invention, I provide a stationary field-winding coaxial with which is a rotating field core provided at its ends with non-circular pole-pieces. Co-planar with each of these pole-pieces I provide a core for a suitable armature winding, the two armature cores being magnetically interconnected as through the medium of an enclosing housing of magnetic material. As the field-core and its pole-pieces rotate, the magnetic flux threading the windings on the armature cores is varied to generate an alternating current in the armature windings. A portion of the alternating current generated in the armature windings is rectified, conveniently by a commutator rotatable with the field-core; and the rectified current is employed to energize the field-winding and may also be conducted to a storage battery or other device requiring direct-current for operation. That portion of the alternating current which is not rectified may be used for any suitable purpose, such as for lamps, fans, a radio set, or for the ignition system if the generator is installed in an automobile.

The accompanying drawing illustrates my invention: Fig. 1 is an axial section through the generator on the line 1—1 of Fig. 2; Fig. 2 is a transverse section on the line 2—2 of Fig. 1; and Fig. 3 is a diagrammatic illustration of the electrical connections.

As indicated in the drawing, the generator comprises a hollow cylindrical shell 10, which, with end members 11 and 12, constitutes the frame of the machine. The particular generator illustrated in the drawing is intended for use in an automobile in association with a belt-drive, and the end member 12 is therefore shown as being provided with an outwardly projecting, slotted mounting bracket 13 by means of which the generator can be secured in place.

Mounted inside the shell 10 and co-axial therewith is a field-coil 15 suitably supported from the shell in any convenient manner. A shaft 16, extending axially through the shell 10 and journaled in suitable bearings in the end members 11 and 12, carries within the field coil 15 a core 17 of magnetic material. The core 17 projects axially beyond the ends of the coil 15, where it is provided with non-circular pole pieces 18 of magnetic material magnetically continuing with the core 17.

In the plane of each of the pole pieces 18 there is mounted within the shell 10 an armature core 20 provided with radial slots for the reception of coils constituting the armature windings. For convenience of description, the armature coils at one end of the machine, shown at the left-hand end in Fig. 1, are designated 21 in the drawing, while the coils at the other end are designated 21'. Conveniently, each armature core 20 is laminated and fits closely within the shell 10, which is of magnetic material.

The shaft 16 projects outwardly beyond one of the end members, here shown as the end member 12, and is there provided with a drive pulley 25 for co-operation with the driving belt (not shown). As the shaft 16 is rotated, the pole pieces 18 rotate with it, thus causing a magnetic field of varying density to thread the several armature windings 21 and 21' to generate an alternating current therein. The various coils constituting each of the armature windings may be connected together in series, in parallel, or in series-parallel in order to produce current of the desired characteristics.

A portion of the alternating current generated in the windings 21 and 21' is rectified; and for this purpose, I find it convenient to mount a commutator 27 on the shaft 16. The number of segments in the commutator 27 will depend upon the number, arrangement, and connection of the coils constituting the armature winding from which direct current is to be obtained, and also upon the number of pole-projections on the pole pieces 18.

In the arrangement illustrated in the drawing, a pair of brushes 30, associated with the commutator 27 and located diametrically opposite each other, are connected across the ends of the field winding 15. A second pair of brushes 31, disposed diametrically opposite each other and midway between the brushes 30, are associated with the commutator 27 and connected respectively to the ends of one of the armature windings, here shown as the winding 21.

With the device as illustrated and so far described, rotation of the shaft 16 generates an alternating current in the armature windings 21 and 21', the frequency of this current being equal to twice the speed of rotation of the shaft 16. At least a portion of the alternating current generated in the winding 21 is rectified by the commutator 27 and brushes 30 and 31, the rectified current being supplied to the field coil 15 to maintain the magnetic field threading the armature windings. Alternating current for any purpose may be supplied to an outside load 33 connected across the terminals of either or both of the armature windings 21 and 21'; while D. C. current, as for use in charging a storage battery 34, may be taken from the ends of the field winding 15 or from the brushes 30.

In order to prevent short-circuiting of the D. C. load by the segments of the commutator 27, I find it advisable to separate each end of each segment from the adjacent end of the other segment by insulation 35 having an angular extent at least equal to that of each of the brushes 30. When this is done, the circuit including the field coil 15 is interrupted twice during each rotation of the shaft 16, and I find that the generator is generally unstable and that the current it produces builds up relatively slowly. To overcome these disadvantages, I may connect across the field 15 a resistance 40 so that the field 15 will always form a part of a permanently continuous circuit. As a result of the presence of the resistance 40 the E. M. F. generated by auto-induction in the field coil 15 when the insulation 35 passes across the brushes 30 is impressed across the resistance 40, and current therefore continues to flow through the field winding. I find it desirable for the resistance 40 to have about three times the resistance of the field coil 15.

When my generator is used in an automobile, D. C. current taken from across the brushes 30 may be used to charge the storage battery, while A. C. current taken from the armature windings 21 and 21' can be used for substantially any other purpose, for the ignition, for the lamps, for a radio set, or for an automobile-body heater employing an electrical resistance unit as a source of heat. It is to be noted that current supplied to any of the last named translating devices comes direct from the windings without the necessity for any intervening collector rings, commutators, or brushes.

I claim as my invention:

1. An electric generator, comprising a stationary field coil, a field-core mounted for rotation coaxially therewith, non-circular pole-pieces carried by said field-core beyond the ends of said field coil, armature cores associated respectively with said pole-pieces and magnetically interconnected, armature windings associated with each of said pole-pieces, and means including a commutator rotatable with said field-core for rectifying and supplying to said field coil a portion of the current generated in at least one of said armature windings.

2. In combination, an electric generator having a stationary field coil, an outside direct-current load, a field-core mounted for rotation coaxially with said field coil, non-circular pole-pieces carried by said core and disposed beyond the ends of said field coil, an armature core stationarily mounted in the plane of each of said pole pieces, means of magnetic material interconnecting said armature cores, an armature winding on each of said armature cores, an outside alternating-current load connected to at least one of said armature windings, and means for rectifying and supplying to said field coil and to said direct-current load portions of the current generated in at least one of said armature windings as said field-core and pole pieces rotate.

3. An electric generator, comprising a stationary field coil, a field core mounted for rotation coaxially with said field coil, non-circular pole-pieces carried by said core and disposed beyond the ends of said field coil, an armature core stationarily mounted in the plane of each of said pole pieces, means of magnetic material interconnecting said armature cores, an armature winding on each of said armature cores, leads associated with each of said armature windings and adapting it for independent connection to an outside alternating-current load, direct-current leads, and means for rectifying and supplying to said field coil and to said direct-current leads portions of the current generated in at least one of said armature windings as said field-core and pole pieces rotate.

4. An electric generator, comprising a stationary field coil, a field core mounted for rotation coaxially with said field coil, non-circular pole-pieces carried by said core and disposed beyond the ends of said field coil, an armature core stationarily mounted in the plane of each of said pole pieces, means of magnetic material interconnecting said armature cores, an armature winding on each of said armature cores, leads associated with each of said armature windings and adapting it for independent connection to an outside alternating-current load, direct-current leads, means for rectifying and supplying to said field coil and to said direct-current leads portions of the current generated in at least one of said armature windings as said field-core and pole pieces rotate, said last named means including a commutator and associated brushes, and a resistance element connected across said field coil to maintain said field coil in a continuously closed circuit irrespective of the action of said commutator and brushes, said resistance element having a resistance equal approximately to three times the resistance of the field coil.

5. An electric generator, comprising a stationary field coil, a field core mounted for rotation coaxially with said field coil, non-circular pole-pieces carried by said core and disposed beyond the ends of said field coil, an armature core stationarily mounted in the plane of each of said pole pieces, means of magnetic material interconnecting said armature cores, an armature winding on each of said armature cores, leads associated with each of said armature windings and adapting it for independent connection to an outside alternating-current load, direct-current leads, means for rectifying and supplying to said field coil and to said direct-current leads portions of the current generated in at least one of said armature windings as said field-core and pole pieces rotate, said last named means including a commutator and associated brushes, and a resistance element connected across said field coil to maintain said field coil in a continuously closed circuit irrespective of the action of said commutator and brushes.

6. An electric generator, comprising a stationary field coil, a field-core mounted for rotation coaxially with said field coil, non-circular pole-pieces carried by said core and disposed beyond the ends of said field coil, an armature core stationarily mounted in the plane of each of said pole pieces, means of magnetic material interconnecting said armature cores, an armature winding on each of said armature cores, leads associated with each of said armature windings and adapting it for connection to an outside alternating-current load, direct-current leads, and means for rectifying and supplying to said field coil and to said direct-current leads portions of the current generated in only one of said armature windings as said field-core and pole pieces rotate.

JARL M. WEYDELL.